United States Patent
Chatzandroulis et al.

(10) Patent No.: US 6,704,185 B2
(45) Date of Patent: Mar. 9, 2004

(54) CAPACITIVE PRESSURE-RESPONSIVE DEVICES AND THEIR FABRICATION

(75) Inventors: Stavros Emmanuel Chatzandroulis, Pieras (GR); Dimitrios Mattheos Goustouridis, Egaleo (GR); Dimitris Konstantin Tsoukalas, 71A A. Papandreou Street, Glyfada, GR-16675, Athens (GR); Pascal Jean Michel Normand, 24-26 Imvrou Street, Dafni, GR-17237, Athens (GR)

(73) Assignees: National Center for Scientific Research, Athens (GR); Dimitris Konstantin Tsoukalas, Athens (GR); Pascal Jean Michel Normand, Athens (GR)

( * ) Notice: Subject to any disclaimer, the term of this patent is extended or adjusted under 35 U.S.C. 154(b) by 0 days.

(21) Appl. No.: 10/204,738

(22) PCT Filed: Feb. 19, 2001

(86) PCT No.: PCT/IB01/00208

§ 371 (c)(1),
(2), (4) Date: Nov. 5, 2002

(87) PCT Pub. No.: WO01/63645

PCT Pub. Date: Aug. 30, 2001

(65) Prior Publication Data

US 2003/0107868 A1 Jun. 12, 2003

(30) Foreign Application Priority Data

Feb. 23, 2000 (EP) .......................................... 00600002
Feb. 13, 2001 (GR) ...................................... 20010100079

(51) Int. Cl.$^7$ ................................................. H01G 7/00
(52) U.S. Cl. ................. 361/283.1; 361/283; 361/283.4; 361/305; 438/48; 438/53

(58) Field of Search .............................. 361/283.1, 303, 361/305, 283, 283.3, 283.4; 438/48, 53, 455, 456

(56) References Cited

U.S. PATENT DOCUMENTS 4,203,128 A    5/1980   Guckel et al.

(List continued on next page.)

FOREIGN PATENT DOCUMENTS

| DE | 3426165 | 4/1985 |
| EP | 0 639 761 | 6/1994 |
| JP | 04-003929 | 1/1992 |
| JP | 10-111203 | 4/1998 |

OTHER PUBLICATIONS

Chatzandroulis, et al., "A Solid–State Pressure–Sensing Microsystem for Biomedical Applications," *Sensors and Actuators*, (1997), pp. 551–555.

(List continued on next page.)

*Primary Examiner*—Dean A. Reichard
*Assistant Examiner*—Nguyen T. Ha
(74) *Attorney, Agent, or Firm*—Wallenstein Wagner & Rockey Ltd.

(57) ABSTRACT

A method for making capacitive silicon pressure sensors and pressure switches with high long-term stability involves fabrication by wafer bonding of a silicon substrate wafer with another silicon wafer where a highly boron-doped diaphragm is defined by a self-aligned doping process through a window defined on an insulating layer. The long-term stability of the device is secured by anisotropically etching the window, e.g. by reactive ion etching, so as to create vertical window walls. The flatness of the diaphragm can be secured by the provision of an insulating film on the backside of the substrate wafer that compensates the stress on the silicon diaphragm created by the insulating layer present between the two wafers. The cavity formed by the window may contain gas or it may be evacuated in which case the fabrication method may also involve a process step facilitating the evacuation of the cavity and sealing the same using metal employed for making electrical connections.

14 Claims, 10 Drawing Sheets

U.S. PATENT DOCUMENTS

| | | | |
|---|---|---|---|
| 4,586,109 A | | 4/1986 | Peters et al. |
| 4,612,599 A | * | 9/1986 | Ziegler |
| 4,960,177 A | | 10/1990 | Holm-Kennedy et al. |
| 5,157,973 A | * | 10/1992 | Ciminelli |
| 5,207,103 A | | 5/1993 | Wise et al. |
| 5,321,989 A | | 6/1994 | Zimmer et al. |
| 5,357,808 A | * | 10/1994 | Fung et al. |
| 5,510,276 A | | 4/1996 | Diem et al. |
| 5,578,843 A | | 11/1996 | Garabedian et al. |
| 5,706,565 A | | 1/1998 | Sparks et al. |
| 5,744,725 A | * | 4/1998 | Chen et al. |
| 6,109,113 A | * | 8/2000 | Chavan et al. |
| 6,465,271 B1 | * | 10/2002 | Ko et al. |

OTHER PUBLICATIONS

Chau, Hin–Leung and Wise, Kensall D., "An Ultraminiature Solid–State Pressure Sensor for a Cardiovascular Catheter," IEEE Transactions on Electron Devices, vol. 35, No. 12, Dec. 1988, pp. 2355–2362.

Goustouridis, et al., "A Miniature Self–Aligned Pressure Sensing Element," J. Micromech. Microeng., (1996), pp. 33–35.

Puers, et al., "An Implantable Pressure Sensor for Use in Cardiology," Sensors and Actuators, (1990), pp. 944–947.

Smith, et al., "Analysis, Design, and Performace of a Capacitive Pressure Sensor IC," IEEE Transactions on Biomedical Engineering, vol. BME–33, No. 2, (Feb. 1986), pp. 163–173.

Ziaie, et al. "An Implantable Pressure Sensor Cuff for Tonometric Blood Pressure Measurement," University of Michigan.

* cited by examiner (Cross section) Fig 3b (Plan view)

(Cross section) (Plan view)

 
Fig 5a                Fig 5b
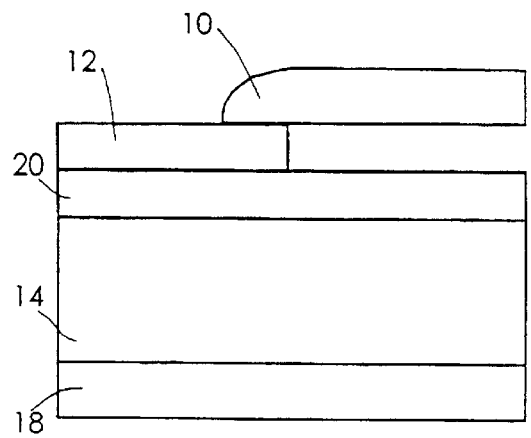 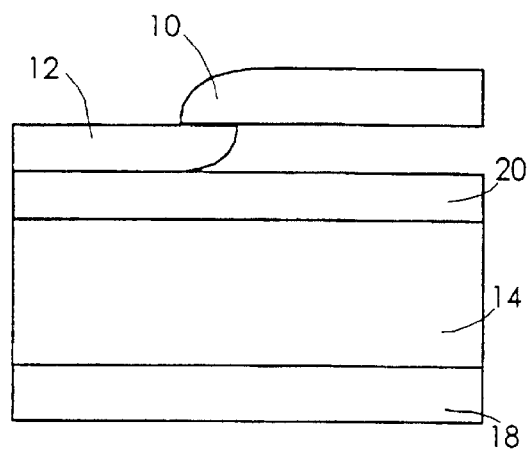
Fig 6a                Fig 6b

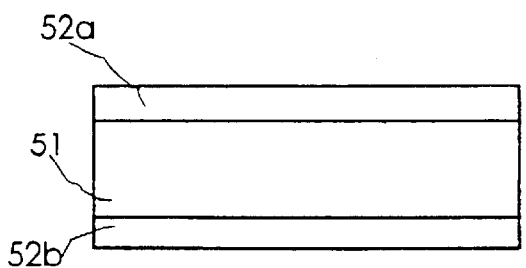
Fig 8a
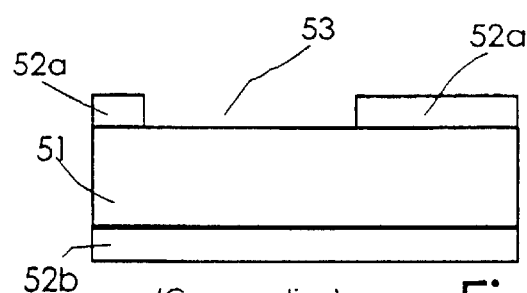
(Cross section) Fig 8b
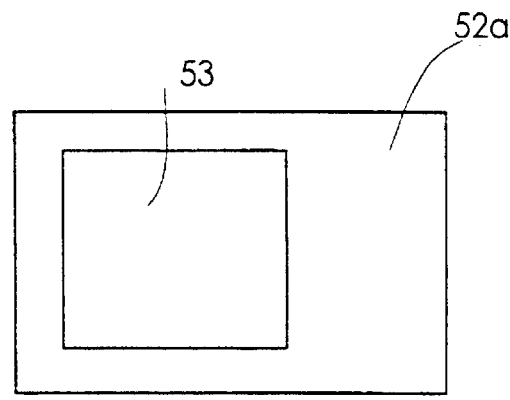
(Plan view)
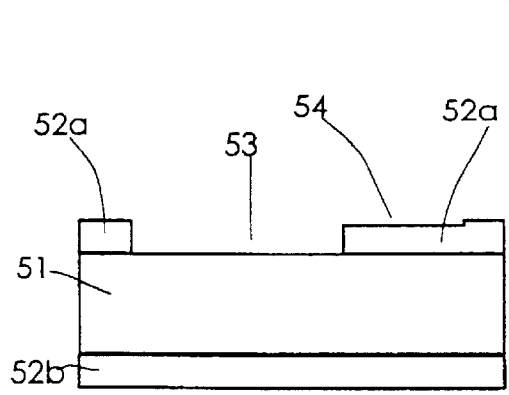
(Cross section) Fig 8c
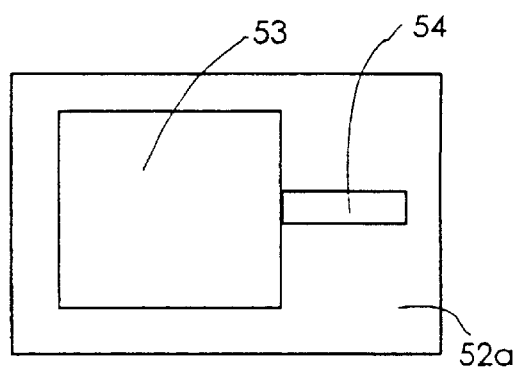
(Plan view)
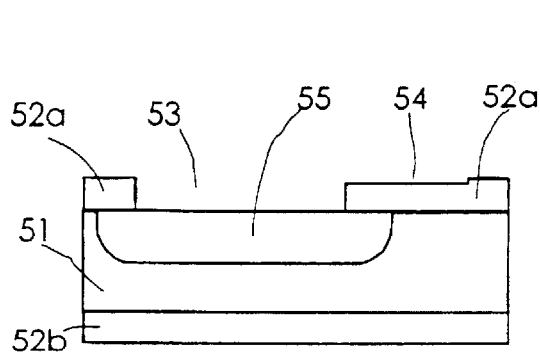
(Cross section) Fig 8d
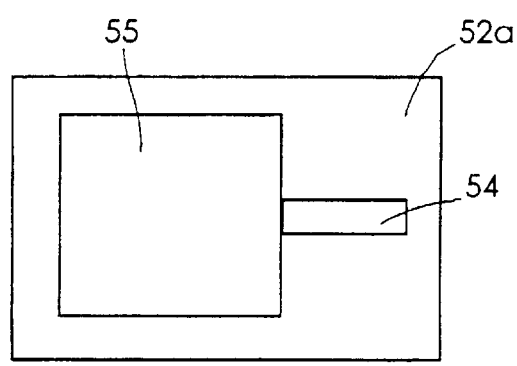
(Plan view)

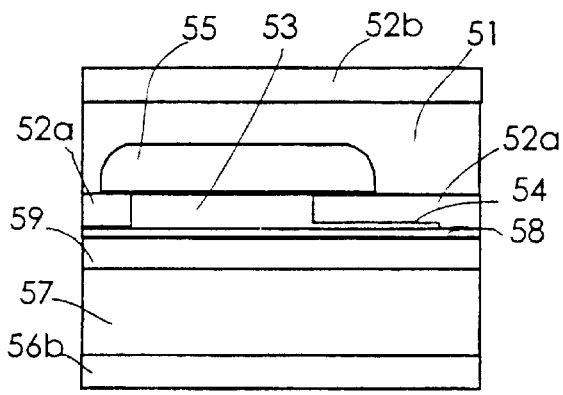
Fig 10a
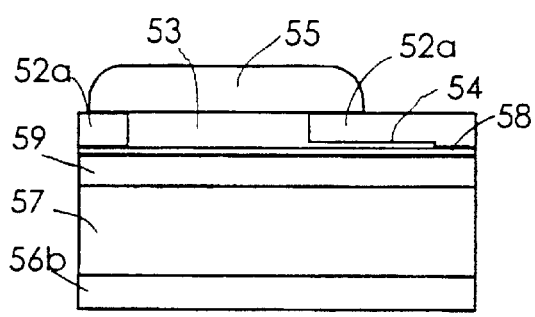 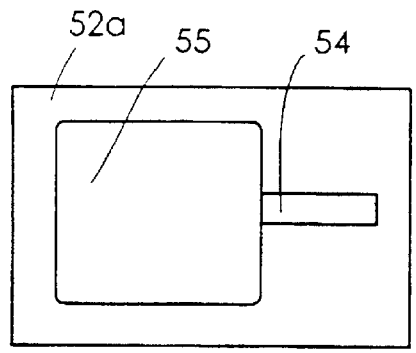
(Cross section) Fig 10b (Plan view)
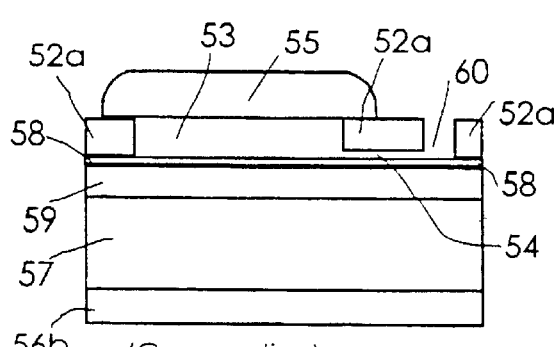 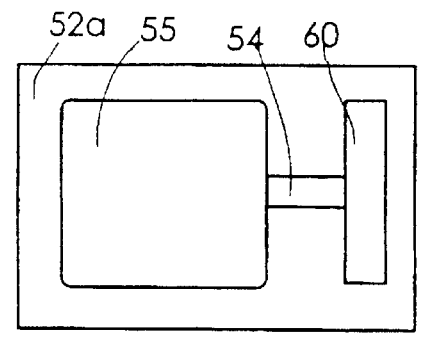
(Cross section) Fig 10c (Plan view)

CAPACITIVE PRESSURE-RESPONSIVE DEVICES AND THEIR FABRICATION

This Application is a U.S. National filing under §371 of International Application No. PCT/IB01/00208, filed Feb. 19, 2001, claiming priority from EP Appln. No. 00600002.0, filed Feb. 23, 2000 and British Appln. No. 20010100079, filed Feb. 13, 2001, now pending (which is hereby incorporated by reference).

This invention relates to pressure sensing devices and the fabrication thereof.

BACKGROUND OF THE INVENTION

In a paper entitled "A miniature self-aligned pressure sensing element" by Goustouridis, Chatzandroulis, Normand and Tsoukalas (J. Micromech. Microeng. 6 (1996) pp 33 to 35), the entire contents of which are incorporated herein by reference, there is disclosed a fabrication technique for the production of a capacitive-type pressure sensor. Although this is a simple fabrication process which secures self-alignment and requires the use of only three masks, for no readily apparent reason sensors produced by the process were found to be unreliable in terms of long term stability.

A primary objective of at least certain aspects of the present invention is to provide an improved pressure-responsive device having reliable long term stability.

Other objectives of certain aspects of the present invention include the provision of:

a fabrication process for a capacitive single crystal silicon sensor with good characteristics in terms of long-term stability;

a fabrication process that may be based on a self-aligned technique which, if combined with thin film stress engineering, permits the fabrication of flat or deflected silicon diaphragms according to application; and a fabrication process for a pressure switch based on the ohmic contact of two electrodes namely of the mobile and immobile electrodes made using a similar self-aligned process.

SUMMARY OF THE INVENTION

According to one aspect of the present invention there is provided a capacitive pressure-responsive device comprising first and second electrode structures having opposed surfaces with a spacing layer therebetween, the spacing layer being formed with a window which defines a cavity between the two electrode structures to allow the spacing therebetween to vary in dependence upon external pressure, characterised in that the window is produced with side walls which are substantially free of any localised undercut region in the vicinity of the interfaces with the adjacent electrode structures.

According to a second aspect of the present invention there is provided a process for the production of a capacitive pressure-responsive device comprising first and second electrode structures having opposed surfaces with a spacing layer therebetween, the spacing layer being formed with a window which defines a cavity between the two electrode structures to allow the spacing therebetween to vary in dependence upon external pressure, characterised in that the window is formed by anisotropic etching.

The window may be formed after the formation of the spacing layer.

Anisotropic etching will be understood to refer to an etching process which attacks the substrate, e.g. a silicon wafer, essentially in one direction only. Thus, by anisotropic etching it is possible to etch an aperture in a substrate such that the walls of the aperture are substantially perpendicular to the surface of the substrate. Ion assisted processes are particularly effective in securing highly anisotropic etching, resulting in a vertical profile (see Pages 199, 200 of VLSI Technology by S. M. Sze, McGraw Hill).

By forming the window by anisotropic etching, it is possible to obtain window side walls which are substantially free of any localised undercut region in the vicinity of the interface with the electrode on which the spacing layer is provided.

Through the elimination of such localised undercut region or regions, we have found that reliable long term stable performance of the sensor may be secured. The process of Goustouridis et al involves producing the window by means of an HF solution. We have discovered that the use of an HF solution, viz. an isoptropic technique, results in the formation of undercut regions in the vicinity of the window side wall/electrode interface and that this effect is responsible for the unreliable long term stability of sensors produced when following the teaching of Goustouridis et al.

The arrangement may be such that one electrode structure is substantially rigid or immobile while the other electrode structure is capable of flexing under applied external pressure whereby the spacing between the two electrode structures across the cavity varies with the applied external pressure.

The device may be fabricated as a switch device giving an output in response to the applied pressure attaining a predetermined threshold value, or as a sensor device giving an output which varies with the applied external pressure.

The spacing layer is preferably provided on the flexible electrode structure and may be formed integrally therewith.

The etching technique may comprise a drying etching technique, preferred examples of which are anisotropic plasma etching and anisotropic reactive ion etching.

Each electrode structure may be formed by a wafer of semiconductor material such as silicon, e.g a n-type or p-type silicon wafer. Thus, for instance, one electrode may comprise p-type silicon material and the other may comprise n-type silicon material. However, we do not exclude the possibility of one or both electrodes being formed of other conductive material such as a metal, e.g. the immobile electrode may be of metal.

The relatively flexible electrode structure may comprise an integrally formed structure made from a flexible highly conductive single crystal silicon by selectively dissolving part of the wafer away to leave a relatively highly doped region forming the electrode. The silicon may be doped with any element, e.g. boron, or combination of elements so that a relatively highly doped part of the silicon wafer exhibits an etching selectivity with respect to lightly doped or non-doped silicon. Boron is the preferred dopant.

Doping of the silicon, e.g. with boron, may be effected by doping through said window with vertical walls, the spacing layer serving during the doping step to restrict the doping primarily to the zone of the semiconductor wafer in registry with the window.

The doping step may be carried out in such a way that the dopant also penetrates laterally beyond the perimeter of the window so that there is some degree of overlap between the resulting flexible electrode and the spacing layer. The degree of overlap is generally comparable with the thickness of the flexible electrode.

The fabrication process of the invention may be carried out using only three masks for the complete fabrication of the wafer assembly including preparation for a metallization step. Also, as in Goustouridis et al, precise alignment is not necessary between the two bonded wafers during the fabrication.

The doped flexible electrode may be provided with an electrically insulating film on one or its both sides.

That surface of the less flexible electrode which is bonded to the spacing layer may be provided with a thin electrically insulating film to avoid electrical shorting of the capacitance between flexible and fixed electrode.

The less flexible electrode may be provided with a thick stress compensating layer on that surface remote from the spacing layer. This is particularly suitable for, but is not restricted to, applications requiring the fabrication of flexible diaphragms that should be flat, for instance for use in the pressure measurement of the body by the tonometric technique.

The cavity may contain gas which may, if desired, be pressurised, or it may be at least partially evacuated, e.g. substantially totally evacuated.

Any one of the electrically insulating films applied to the surfaces of the semiconductor wafers may be such as to resist high temperature treatment, e.g. a thermally grown oxide.

BRIEF DESCRIPTION OF THE FIGURES

The invention will now be described by way of non-limiting example only with reference to the accompanying drawings, in which:

FIGS. 5(a) and (b) are Scanning Electron Microscopy images of cross sections of the diaphragm that underline the importance of vertical wall patterning of the cavity in the insulating film;

FIGS. 6(a) and (b) are enlarged fragmentary sectional views illustrating the importance of the vertical wall configuration of the window;

FIGS. 8 to 10 are diagrams (some cross-sectional views and some plan views) illustrating a modified fabrication process in accordance with the invention.

DETAILED DESCRIPTION

In the embodiments described below, the pressure-responsive device comprises a flexible single crystal boron doped electrode formed over a cavity that is made by patterning an electrically insulating film (e.g. thermally grown silicon dioxide) on the same silicon wafer embodying the flexible electrode. The device further comprises a substantially immobile electrode provided on a doped substrate silicon wafer constituting the other plate of the capacitor. The cavity is sealed by the flexible electrode and the substrate so that it is isolated from the outside ambient.

The way the insulating film is removed from the patterned areas has significant impact on the long-term stability of the sensor. If the etching of the insulating film is not anisotropic, the sensor or the switch does not provide reliable performance in terms of long term stability since the diaphragm may never be at the same position for the same applied pressure, as will be explained in further detail below.

The flatness of the flexible membrane mostly depends on the stress that is exercised on it by the insulating film. To compensate for this stress, another insulating film, which may be thicker, is also formed on the other side of the substrate wafer. Depending on the applied pressure under measurement, the design may be such that the flexible membrane touches the substrate while the capacitance continues to change since a thin insulating film on the substrate electrode can be employed to prevent electrical shorting between the diaphragm and the substrate. The substrate wafer may also play a protective role against overpressure for the flexible diaphragm.

When a pressure switch is required, there is no insulating film on the surface of the immobile electrode. In this case, when the mobile electrode touches the immobile electrode current flows through this contact and a value of the corresponding pressure is detected.

The lithography steps for the sensor or the switch may be only three, namely the diaphragm size definition step, the substrate contact definition step and the metallization step. The flexible electrode is typically in the form of a membrane with a thickness which is usually less than five microns and the gap spacing between the electrodes is typically less than two microns. The sealing of the cavity may be achieved by directly bonding the two wafers and annealing to strengthen the bonds. Precise alignment between the two wafers is not necessary.

The sensors or switches fabricated in accordance with the invention may afford exceptional characteristics on long-term stability and the possibility of influencing the degree of flatness enables their utilization in a variety of applications. The technique has also the advantage to lead to an advanced level of miniaturization of the sensor device.

Figure 1A:
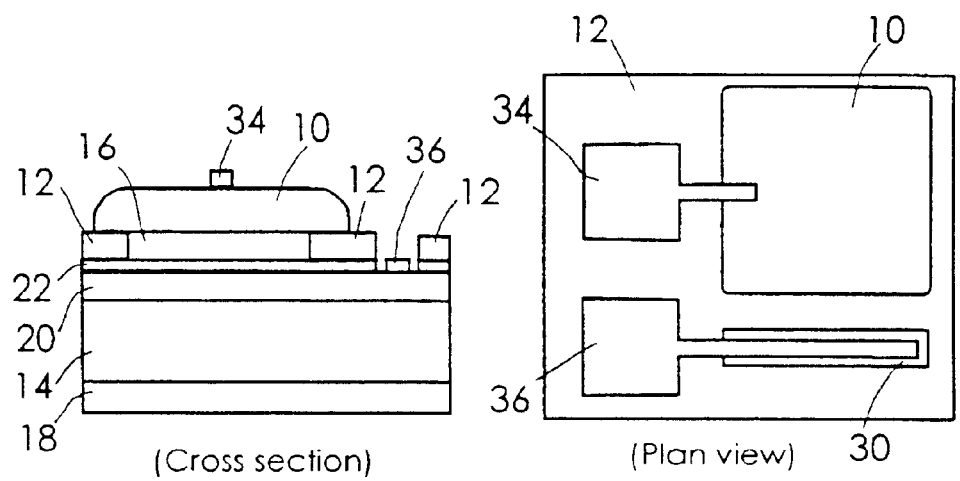
FIGS. 1(a) and (b) are diagrammatic sectional and plan views of a pressure sensor device and a pressure switch device respectively.

Referring to the pressure sensor of FIG. 1(a) an electrode in the form of a flexible boron doped silicon diaphragm 10 contacts the edges of an electrically insulating film 12. The diaphragm 10 forms one plate of a capacitor, the other capacitor plate or electrode being formed by the silicon wafer 14 that is enriched with dopants on its surface to form a highly conductive layer 20. In this embodiment, an insulating layer 22 overlies the conductive layer 20. A cavity 16 is provided between the two capacitor plates. Within the cavity 16 and between the two plates of the capacitor there may be a gas of known pressure. Alternatively, as described hereinafter, the cavity may be at least partially or substantially totally evacuated.

It will be understood that the flexible electrode 10 undergoes deflection in response to changes in the external pressure relative to the internal pressure of the cavity 16. This deflection changes the value of the capacitance of the capacitor. There may therefore be a one to one relationship between external pressure and measured capacitance that permits the estimation of the pressure if the capacitance is known. Connection of the capacitor, i.e. connection of electrode 10 and of the substrate 14, to the outside world may be made through thin metal films and/or wired connections according to the usual procedures of integrated circuit technology.

Figure 1B:
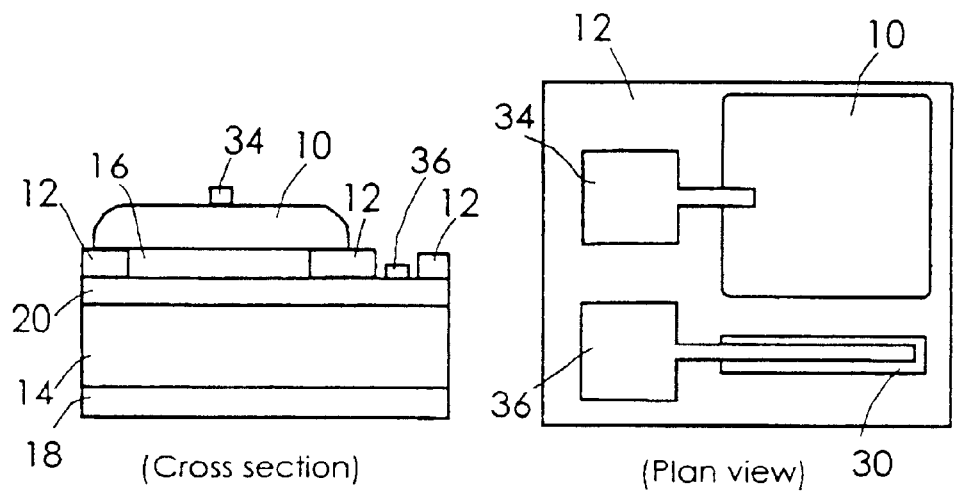

In FIG. 1(b), the device comprises a pressure switch, the configuration of which is generally similar to that of FIG. 1(a), like components being depicted by like reference numerals. In this device, the insulating film 22 is not present thus when the pressure reaches a certain value the flexible boron doped silicon diaphragm 10 directly contacts the conductive layer 20 of wafer 14. When the two electrodes are in contact, current flows through the area of contact. It is thus possible to relate the pressure value with the current flow. The contacts of the electrode 10 and the substrate with the outside world are taken through thin metal films and/or wiring according to the usual procedures of integrated circuit technology In both of the embodiments of FIGS. 1(a) and 1(b), to secure the long-term stability of the pressure sensor, the walls of the insulating film 12 in which the window surrounding the cavity 16 is formed must, for reasons discussed below, be as vertical as possible, viz. perpendicular to the faces of the electrode 10 and the wafer 14.

Figure 7A:
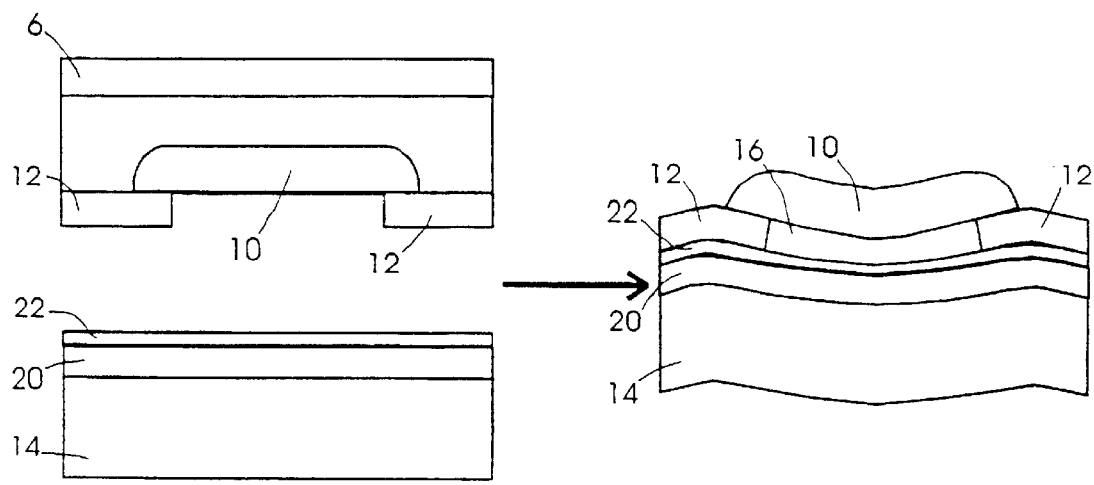
FIGS. 7(a) and (b) demonstrate the importance of the backside insulating film of the substrate wafer on the flatness of the diaphragm.
Figure 7B:
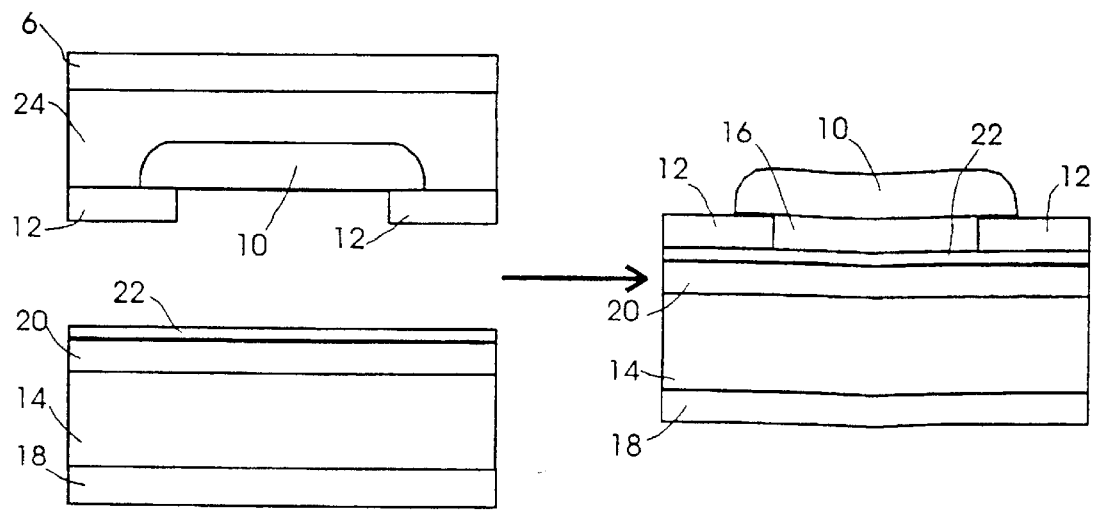
Figure 9A:
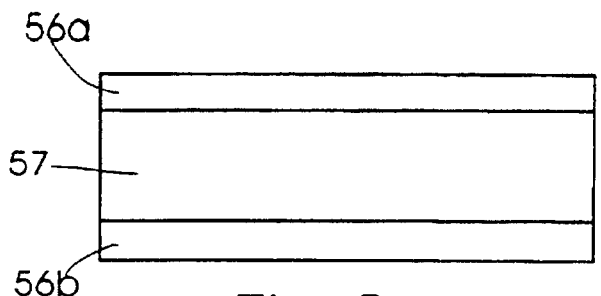
Figure 9B:
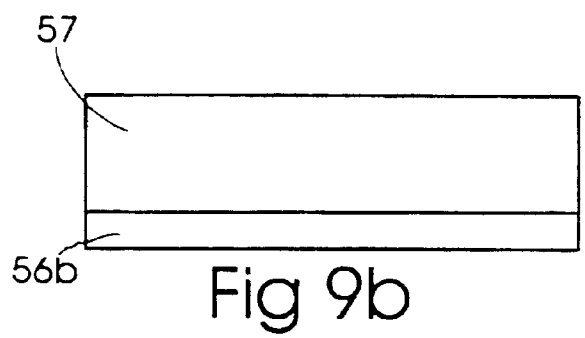
Figure 9C:
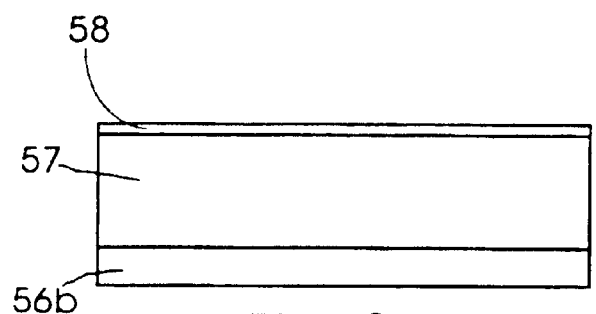
Figure 9D:
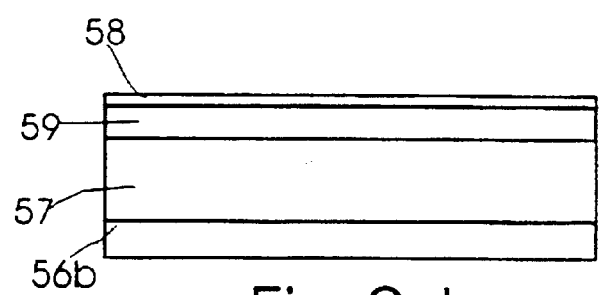

To achieve flatness in the diaphragm 10, a thin film 18 is desirably present on the other side of the substrate wafer 14 to compensate for the stress induced on the diaphragm by the insulating film 12. The film 18 may also be an insulating film. The manner in which the flatness of the diaphragm 10 is controlled by the backside film 18 as illustrated in FIGS. 7(a) and 7(b), where it will be noted that a greater degree of flatness is achievable when the film is present (FIG. 7(b)) than when it is absent (FIG. 7(a)).

The relative physical dimensions of the sensor as they appear in the drawings are for illustrative purposes. The size of the sensor may of course vary according to the masks used during its fabrication and different area sensors/can be fabricated on the same wafer.

Figure 2A:
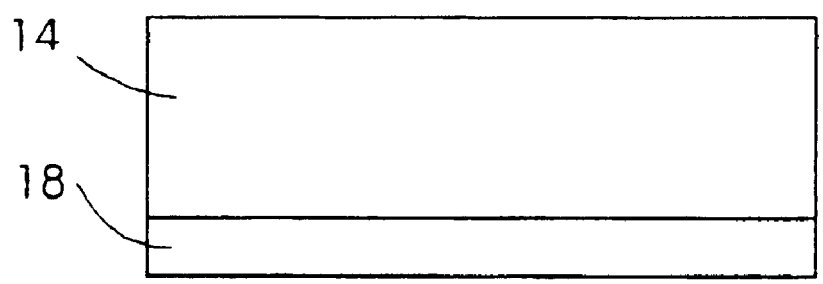
FIG. 2 to FIG. 4 are diagrams (some cross-sectional views and some plan views) illustrating the fabrication process steps for the sensor.
Figure 2B:
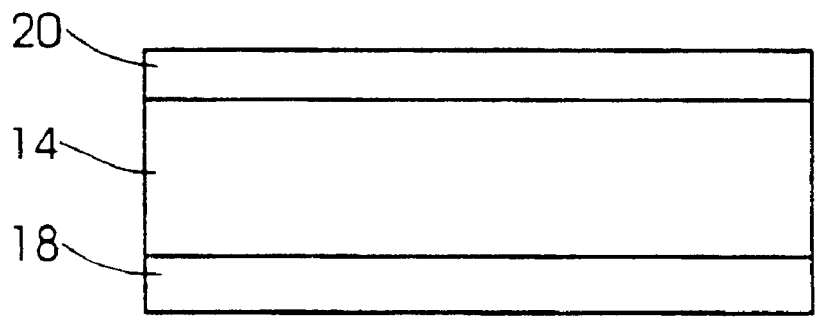
Figure 2C:
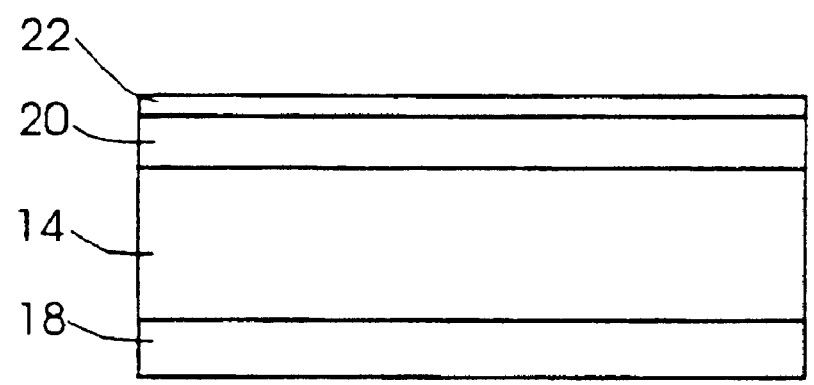
Figure 3A:
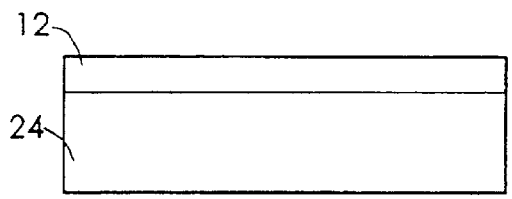
Figure 3C:
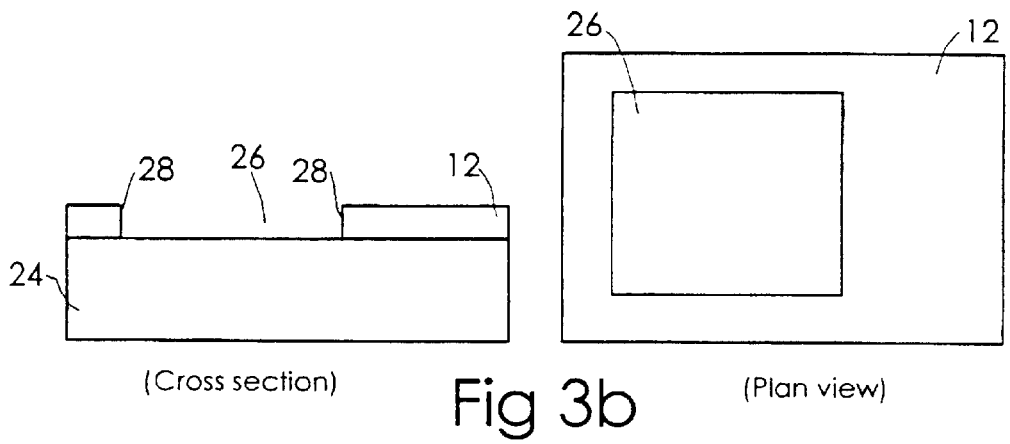
Figure 3C:
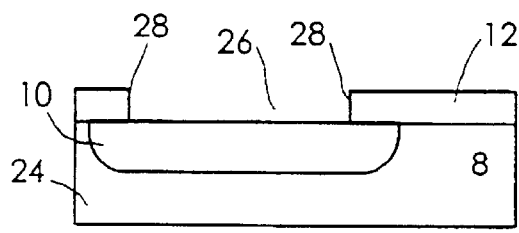
Figure 3D:
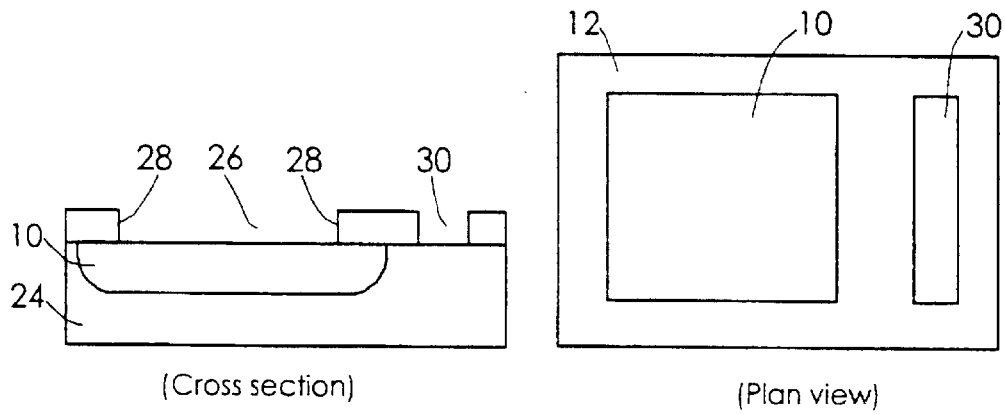
Figure 4A:
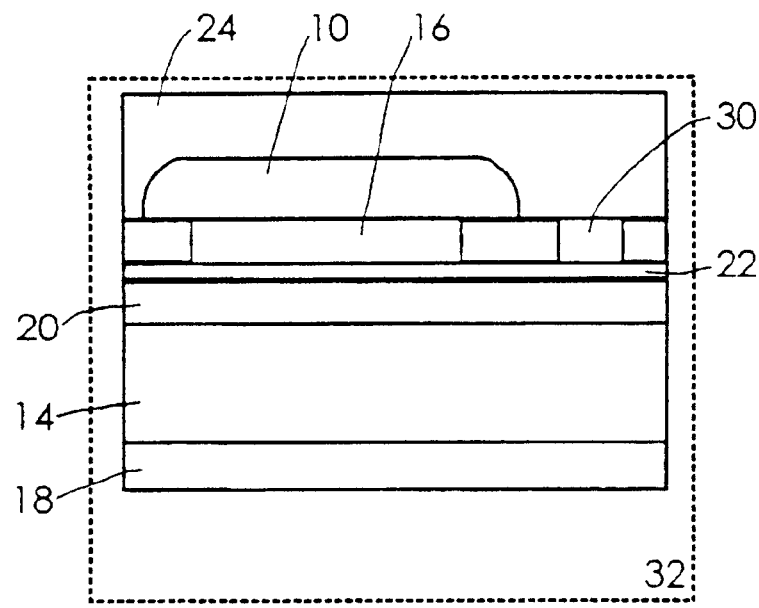
Figure 4B:
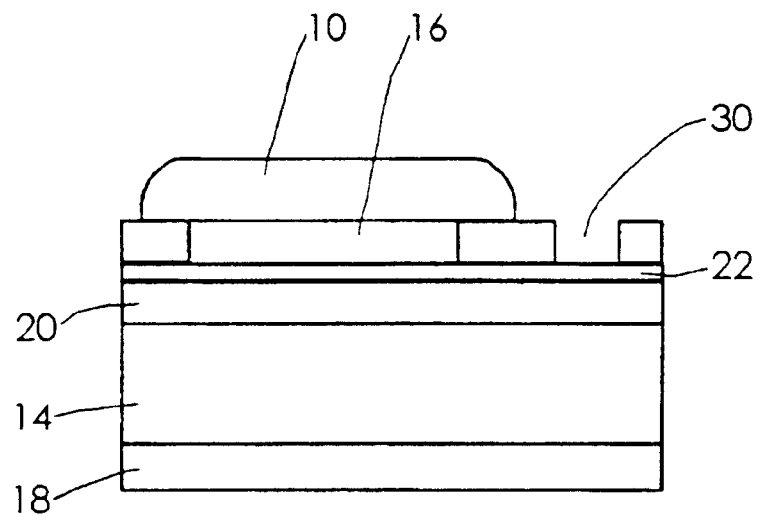

Referring now to FIGS. 2 to 4 which show the fabrication process for production of the sensor. The insulating film 18 is formed on the backside surface of the single silicon crystal wafer 14 of either p or n type, (FIG. 2) for stress compensation purposes and controlling the flatness of the fabricated pressure sensitive diaphragm 10. The film 18 is typically formed by thermal oxidation of the wafer on both sides to produce an $SiO_2$, layer of about 1 micron thickness on each side, followed by removal of the layer on one side so as to leave the layer 18 on the other side. The front side of the wafer 14 is doped by ion implantation in conventional manner to make a highly conductive layer 20. A thin insulating film 22, e.g. 200 Angstrom, may optionally be formed, by thermal oxidation, in superimposed relation with the conductive layer 20.

A second silicon wafer 24 is then taken and an insulating film 12 is formed by thermal oxidation on its surface (FIG. 3). The insulating film 12 is then patterned using lithographic techniques and an anisotropic etching technique, e.g. anisotropic plasma etching, is used to remove part or parts of the insulating film 12 to form the window patterns 26. The anisotropic etching results in the formation of vertical side walls 28 bounding the window 26 and hence the cavity 16. The size of the pattern on the insulating film as well as the thickness of the insulating film practically define the nominal value of the capacitance. The anistropic etch technique used may be plasma etching (using $CHF_3$ gas) with a high selectivity to the resist used in the lithographic masking of the wafer and with highly anisotropic behaviour with respect to the $SiO_2$ substrate, i.e. a vertical etch rate that is at least several times greater than the lateral etch so that walls of the resulting cavity are substantially vertical. In practice, any plasma etching or reactive ion etching technique that has high selectivity to the lithography resist and good anisotropic behaviour on the $SiO_2$ can be used. By "high selectivity" we mean that the etch rate of the $SiO_2$ is significantly greater than the etch rate of the resist so that the $SiO_2$ layer that is not to be etched is well protected by the resist.

After window formation, the patterned insulating film 12 is doped with boron impurities, preferably using an ion implantation doping technique, that enter into the said silicon wafer 24 only in the patterned areas 26 of the said insulating film 12. Further annealing drives the boron impurities to the required depth. The boron doping can be controlled to determine the final thickness of the pressure sensing diaphragm 10. The thickness of the diaphragm 10 and its surface area as well as the thickness of the insulating film 12 govern the working pressure range of the sensor and its sensitivity. The areas 8 under the insulating film 12 are largely protected from boron doping except for limited zones that are near the edges of the window patterns 26 opened on the insulating film 12, which zones become doped mainly during the annealing step. In this way, only the areas that will be used subsequently as the pressure sensitive diaphragms are doped and because of that the process is called self-aligned. Wafer 24 is then again patterned to open a contact hole or holes 30 that will later be used for producing electrical contact with the substrate wafer 20.

Wafer 14 is bonded to the wafer 24, e.g. by silicon fusion bonding, to make a bonded wafer assembly 32 as shown in FIG. 4. The bonding procedure is achieved by appropriately cleaning the wafer surfaces to render them hydrophilic and then bringing them in contact in a clean room environment whereby Van der Waals forces bond the two surfaces together. To strengthen the bonding the structure is subjected to thermal treatment, e.g. heated above 800° C., so as to permanently bond the two surfaces with Si—O—Si bonds. It will be appreciated that precise alignment between the two wafers is not necessary.

Those portions of the wafer which are either not doped or only lightly doped with boron are then removed with a suitable selective etching solution that attacks the non highly doped silicon at much higher rates than the highly boron doped silicon zones. For details of such an etching solution, see the description below relating to the modified process of FIGS. 8 to 10. The result is the formation of the boron doped silicon diaphragm 10 that is left seated on the insulating film 12 with an overlap that may be comparable with the thickness of the said diaphragm 10. When the two wafers are assembled and bonded together, the insulating film 12 contacts on its one side layer 20 of wafer 14 and at its other side the peripheral margins of the window or windows 26.

The side walls of the cavity 16 defined in the insulating film 12 must be vertical (perpendicular) so as to make sure that the diaphragm 10 is fixed on top of the insulating film 12. The underneath part of the insulating film 12 must also be directly bonded all around the edges of the cavity with the substrate (FIGS. 5(a) and 6(a)). To achieve such vertical side walls 28 of the window patterns anisotropic etching of the insulating film 12 has to be used. This step guarantees the long-term stability of the resulting sensor. If isotropic etching is used (for example Hydrofluoric acid solution) to form the window patterns 26, the structure illustrated in FIGS. 5(b) and 6(b) is obtained. In that case, the underneath part of the insulating film 12 at the edges of the cavity is undercut and hence partly free standing with the consequence that the silicon diaphragm 10 does not repeatably return to the same position when the same pressure is applied at different times. This detrimentally affects the long term stability of the sensor. In contrast, when the window is formed with substantially vertical walls by anisotropic etching as in FIG. 6(a), it will be seen that there is no free standing edge to the film 12; instead the film at its edge is fully supported by the underlying substrate thereby securing a stable structure.

Removal of the non-doped or lightly doped regions of the wafer 24 during the formation of the diaphragm 10 can be performed by first mechanical means, such as grinding, and finally using the chemical selective etching solution. During the chemical etching solution, wafer 14 is protected at its backside by the insulating film 18.

As seen in FIGS. 1 and 2, using conventional metallization techniques of microelectronics, metal contacts 34, 36 can be provided for both the boron doped diaphragm 10 and substrate 20 respectively. The metal contacts may be connected with metal pads where the sensor is connected with miniature wires to an external integrated circuit (not shown) and then to the outside word.

Figure 10D:
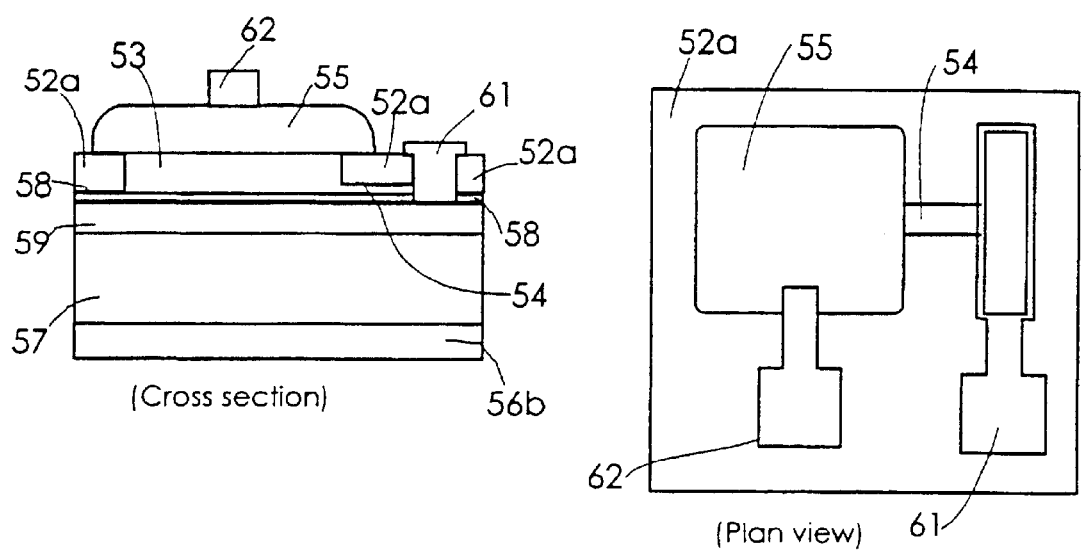

FIGS. 8 to 10 show a modified fabrication process in which provision is made for evacuation and sealing of the cavity. Referring firstly to FIG. 8, the flexible electrode is formed from a first p-type silicon wafer 51 which is subjected to thermal oxidation in known manner to form thick electrically insulating $SiO_2$ layers 52a and 52b, e.g. about 1 micron thick, on each face thereof. A window 53 (see diagrams b) is formed in the oxide layer 52a using photolithography patterning and anisotropic etching (e.g. anisotropic plasma etching). In addition to formation of the window 53, a channel 54 (see diagrams c) is also formed in the layer 52a by photolithography and plasma etching, such that the channel 54 opens at one end into the cavity formed by the window 53. This channel 54 is to be eventually used in the evacuation of the cavity. Typically the depth of the channel 54 is about 1000 Angstrom. Boron doping through the window 53 and annealing is then carried to create the highly doped region 55 (diagrams d) which will subsequently constitute the flexible electrode or diaphragm of the device.

Referring to FIG. 9, electrically insulating $SiO_2$ film layers 56a, 56b are formed (e.g. thermal oxidation) on a second n-type silicon wafer, e.g. each layer being about 1 micron thick, (diagram a). The layer 56a is thereafter removed, for example using HF solution (diagram b). A thin layer of $SiO_2$ which may for example be about 200 Angstrom thick, is formed on the opposite face of the wafer to the layer 56b (diagram c). The wafer is then subjected to doping, e.g. by phosporous implantation and annealing, to produce a conductive layer 59 which will constitute the immobile electrode of the device.

The two wafers are next silicon fusion bonded together to form the structure shown in FIG. 10, diagram a. At this stage, because of the consumption of oxygen by reaction with Si during the fusion bonding step, the pressure within the cavity 53 may correspond to the nitrogen partial pressure of air, i.e. 0.8 atmosphere. As in the process of FIGS. 1 to 7, the non-doped or lightly doped region of the wafer 51, including the layer 52b, are next removed, e.g. by etching or a combination of initial grinding (e.g. down to a thickness of about 50 microns) followed by etching using for instance an ethylodiamine-pyrocatechol-water solution. The etching solution specified is effective to remove only the silicon having a boron doping level below $7 \times 10^{19}$ atoms/cm$^3$, thereby leaving the structure comprising the layer 52a and the highly doped electrode region 55 which is integral with the layer 52a and overlaps the latter all around the window 53, the extent of the overlap being approximately comparable with the thickness of the region 55.

Part of the layer 52a which acts as a spacing layer between the two wafers, is next removed by for instance dry plasma etching to form an aperture 60 (diagrams c) which is in communication with the channel 54 thereby creating a fluid flow path from the cavity 53 to the exterior. The aperture 60 also penetrates the oxide layer 54. Metallisation, e.g. aluminium deposition and patterning, is then carried out to form the metal contacts with the diaphragm 55 and the conductive layer 59 which forms the substantially rigid electrode, the metal contacts produced being depicted by references 61 and 62. Prior to or during the deposition of the metal contact 61, the cavity 53 may be evacuated to a desired internal pressure (e.g. substantially zero pressure) and the metal deposition step is carried out so that the metal forming the contact 61 also blocks the channel 54 to seal the cavity 53 in a desired state of evacuation. If the metallisation takes place under vacuum, it will be appreciated that the vacuum established during the metal deposition process will also serve to evacuate the interior of the cavity.

Although claims have been formulated in this application to particular combinations of features, the scope of the disclosure of the present invention extends to any novel feature or combination of features disclosed herein either explicitly or implicitly or any generalisation thereof, irrespective of whether it relates to the same invention as presently claimed and whether it addresses any or all of the same the technical problems as does the present invention as presently claimed. Notice is hereby given that new claims may be formulated to such features and/or combinations of features during the prosecution of the present application or of any further application derived therefrom.

Also it will be appreciated that certain features of the invention which are, for clarity, described in the context of separate embodiments, may also be provided in combination in a single embodiment. Conversely, various features of the invention which are, for brevity, described in the context of a single embodiment may also be provided separately or in any suitable sub-combination.

What is claimed is:

1. A process for the production of a capacitive pressure-responsive device comprising a first relatively flexible electrode structure and a second relatively rigid or immobile electrode structure having opposed surfaces with a spacing layer therebetween, the spacing layer being formed with a window which defines a cavity between the two electrode structures to allow the spacing therebetween to vary in dependence upon external pressure, characterised in that the window is formed by a dry anisotropic etching technique, especially anisotropic plasma or reactive ion etching, so that the side walls of the windows are substantially free of any localised undercut region in the vicinity of the interface with the first relatively flexible electrode structure, the process comprising the steps of:

(a) forming the spacing layer on a wafer of a semiconductor material, optionally n or p type silicon, which forms one of the electrode structures;

(b) forming said window in the spacing layer by said dry anisotropic etching technique;

(c) doping the semiconductor wafer with a material (optionally boron) through the window to form a doped region overlying and extending beyond the perimeter of the window;

(d) assembling the first electrode structure with a second relatively rigid electrode structure so that the window forms a cavity between the two electrode structures; and (e) selectively etching the semiconductor wafer to remove those regions which are not so doped or only lightly doped thereby forming a first relatively flexible electrode structure including said spacing layer.

2. A process as claimed in claim 1 in which the second electrode structure comprises a wafer of semiconductor material which has been doped to form a conductive layer and, optionally, having an insulating layer in superimposed relation with the conductive layer thereof, the first and second electrode structures being assembled together with the spacing layer contacting the conductive layer or the insulating layer if present.

3. A process as claimed in claim 1 including providing the less flexible electrode structure with a stress compensating layer of material on that side thereof remote from the spacing layer.

4. A process as claimed in claim 1 including the steps of forming a passageway in the spacing layer via which the cavity can be evacuated, evacuating the cavity via said passageway and subsequently sealing the passageway by means of conductive contact material to maintain the cavity in a state of evacuation.

5. A capacitive pressure-responsive device comprising a first relatively flexible electrode structure and a second relatively immobile or rigid electrode structure having opposed surfaces with a spacing layer therebetween, the spacing layer being formed with a window which defines a cavity between the two electrode structures to allow the spacing therebetween to vary in dependence upon external pressure, characterised in that the window is produced by a dry anisotropic etching technique, especially anisotropic plasma or reactive ion etching, with side walls which are substantially free of any localised undercut region in the vicinity of the interface with the first relatively flexible electrode structure, in which the relatively rigid or immobile electrode structure has a layer of stress compensating material on that side thereof which is remote from the spacing layer.

6. A device as claimed in claim 5 in which the spacing layer is formed integrally with the flexible electrode structure.

7. A device as claimed in claim 5 in which the relatively rigid electrode structure includes a conductive layer which contacts the spacing layer directly or in which the relatively rigid or immobile electrode structure includes a conductive layer and an insulating layer interposed between the conductive layer and the spacing layer.

8. A device as claimed in claim 5 in which the cavity is at least partially evacuated.

9. A device as claimed in claim 8 in which the cavity is linked to the exterior through a passageway formed in the spacing layer, the passageway being sealed by a conductive contact material, such as aluminium, to maintain the cavity in its state of evacuation.

10. A device as claimed in claim 5 in which the spacing layer comprises silicon oxide.

11. A process for the production of a capacitive pressure-responsive device comprising first and second electrode structures having opposed surfaces with a spacing layer there between, the spacing layer being formed with a window which defines a cavity between the two electrode structures to allow the spacing therebetween to vary in dependence upon external pressure, the process including providing a spacing layer on one of the electrode structures formed with a window, characterized by the steps of forming a passageway in the spacing layer via which the cavity can be evacuated, evacuating the cavity via said passageway and subsequently sealing the passageway by means of conductive contact material to maintain the cavity in a state of evacuation.

12. A process for the production of a capacitive pressure-responsive device comprising a first relatively flexible electrode structure and a second relatively rigid or immobile electrode structure having opposed surfaces with a spacing layer therebetween, the process comprising the steps of:

providing the second electrode structure with a stress compensating layer of material on that side thereof remote from the spacing layer; and forming the spacing layer with a window which defines a cavity between the two electrode structures to allow the spacing there between to vary in dependence upon external pressure;

characterized in that the window is formed by a dry anisotropic etching technique, especially anisotropic plasma or reactive ion etching, so that the side walls of the windows are substantially free of any localized undercut region in the vicinity of the interface with the first relatively flexible electrode structure.

13. A process for the production of a capacitive pressure-responsive device comprising a first relatively flexible electrode structure and a second relatively rigid or immobile electrode structure having opposed surfaces with a spacing layer therebetween, the process comprising the steps of:

forming the spacing layer with a window which defines a cavity between the two electrode structures to allow the spacing there between to vary in dependence upon external pressure;

forming a passageway in the spacing layer via which the cavity can be evacuated;

evacuating the cavity via the passageway;

and subsequently sealing the passageway by means of conductive contact material to maintain the cavity in a state of evacuation;

characterised in that the window is formed by a dry anisotropic etching technique, especially anisotropic plasma or reactive ion etching, so that the side walls of the windows are substantially free of any localised undercut region in the vicinity of the interface with the first relatively flexible electrode structure.

14. A capacitive pressure-responsive device comprising a first relatively flexible electrode structure and a second relatively rigid or immobile electrode structure having opposed surfaces with a spacing layer therebetween, the spacing layer being formed with a window which defines a cavity between the two electrode structures to allow the spacing therebetween to vary in dependence upon external pressure, in which the cavity is at least partially evacuated and linked to the exterior through a passageway formed in the spacing layer, the passageway being sealed by a conductive contact material, such as aluminum, to maintain the cavity in its state of evacuation, and characterised in that the window is produced by a dry anisotropic etching technique, especially anisotropic plasma or reactive ion etching, with side walls which are substantially free of any localised undercut region in the vicinity of the interface with the first relatively flexible electrode structure.

* * * * *